(12) United States Patent
Lu

(10) Patent No.: US 12,227,599 B2
(45) Date of Patent: Feb. 18, 2025

(54) PREPARATION METHOD OF PVA FIBER

(71) Applicant: Zhende Medical Co., Ltd., Shaoxing (CN)

(72) Inventor: Jianguo Lu, Shaoxing (CN)

(73) Assignee: Zhende Medical Co., Ltd., Shaoxing (CN)

( * ) Notice: Subject to any disclaimer, the term of this patent is extended or adjusted under 35 U.S.C. 154(b) by 997 days.

(21) Appl. No.: 17/215,338

(22) Filed: Mar. 29, 2021

(65) Prior Publication Data

US 2021/0214475 A1 Jul. 15, 2021

Related U.S. Application Data

(63) Continuation of application No. PCT/CN2019/110559, filed on Oct. 11, 2019.

(51) Int. Cl.
*C08F 116/06* (2006.01)

(52) U.S. Cl.
CPC .................. *C08F 116/06* (2013.01)

(58) Field of Classification Search
CPC . D01D 1/02; D01D 10/00; D01D 5/06; C08F 8/00; C08F 118/08; D01F 11/06; D01F 6/14; D01F 6/16
See application file for complete search history.

(56) References Cited

FOREIGN PATENT DOCUMENTS

| CN | 101177800 A | 5/2008 |
|---|---|---|
| CN | 103774266 A | 5/2014 |
| JP | H1088420 | * 4/1998 |

OTHER PUBLICATIONS

"European Application No. 19863967.6, European Search Report mailed Jan. 14, 2021", Jan. 14, 2021), 3 pgs.

* cited by examiner

*Primary Examiner* — Camie S Thompson
(74) *Attorney, Agent, or Firm* — Schwegman Lundberg & Woessner, P.A.

(57) ABSTRACT

A preparation method of PVA fiber comprises the following steps: preparing a spinning dope; PVAc is used as a raw material, and dissolved with addition of methanol before filtration, and then the spinning dope is obtained; spinning; the spinning dope is injected into a spinneret, and the ejected fibers are brought into a direct current electrolytic cell, and undergo a series of reactions of alcoholysis, electrolytic catalytic alcoholysis, and the levering of the alcohol; and the solution formulation in the electrolytic coagulation bath comprises alkali, alcohol and water; acid bath; through stretching, drying, washing with water, crimping with hot water and packaging, a finished polyvinyl alcohol fiber product is formed. The mirabilite is not needed in the coagulation bath, and PVA is obtained by the alcoholysis of PVAc in an electrolytic cell, and the produced PVA fibers present high purity and few impurities.

9 Claims, 3 Drawing Sheets

PREPARATION METHOD OF PVA FIBER

CLAIM OF PRIORITY

This application is a continuation application of International Application No. PCT/CN2019/110559, filed 11 Oct. 2019, the benefit of priority of which is claimed herein, and which application is hereby incorporated herein by reference in its entirety.

TECHNICAL FIELD

The invention relates to a field of polyvinyl alcohol fiber production, in particular to a preparation method of PVA fiber.

BACKGROUND

Polyvinyl alcohol (PVA) is a kind of water-soluble polymer, which is obtained by alcoholysis of polyvinyl acetate with each repeating unit containing a hydroxyl group and a large number of hydrogen bonds being contained within and between molecules, thus PVA molecules have high crystallinity, chemical stability, thermal stability and other properties. The polyvinyl alcohol fiber is of an average molecular weight of 60,000 to 250,000, a thermal decomposition temperature of 200 to 220° C., and a melting point of 225 to 230° C.

The existing scheme is shown in FIG. 1, in which PVA is used as the raw material and mirabilite is used in the coagulation bath; however, such a process presents the following disadvantages:

1, the purity of the obtained PVA fiber is not high with numerous impurities;
2. The mirabilite is required in coagulation bath, which causes following problems: the mirabilite solution with a certain concentration is used for the coagulation bath of spinnings in the preparation process of polyvinyl alcohol fiber in Chinese patent 201210416178.5 and Chinese patent 200610032535.2. In these two patents, after the process, although the residual weight ratio of mirabilite is less than 0.1%, $Na_2SO_4 \cdot 10H_2O$ remaining on polyvinyl alcohol fibers acts as a strong electrolyte, and if such fibers are applied to nurse a wound surface of human body, the imbalance of water/electrolyte on the wound surface will be caused and the risk of use will be increased.
3. By-products such as sodium acetate will be produced in the process: the alcoholysis of polyvinyl acetate can be carried out under acidic or basic conditions. A process in basic conditions possesses absolute advantages in economic benefits, so currently, sodium hydroxide and potassium hydroxide are mostly used for the alcoholysis in polyvinyl alcohol production. A basic alcoholysis can be achieved by two alcoholysis processes in PVA production: high-alkali method and low-alkali method. The advantage of the high-alkali method is of a high alcoholysis speed, high production capacity, and the disadvantage thereof lies in numerous side reactions, and more sodium acetate contained in the PVA product, which results in a low PVA purity and high ash content; and the prominent advantage of the low-alkali method is to take a low molar ratio of the alkali and a low consumption of the sodium hydroxide with less side reactions, less by-product sodium acetate correspondingly and a low ash content, and the disadvantage thereof lies in a low alcoholysis speed. A certain amount of sodium acetate will be generated in the case whether the high-alkali method is adopted or the low-alkali method is adopted, and the presence of the sodium acetate raises potential risks for wounds, because the exudate from wounds is mostly water in components, and the water and sodium acetate will generate acetic acid which is easy to volatilize and sodium hydroxide which will inevitably cause certain hazards as a strong alkali. Other studies have shown that a slightly acidic environment will benefit the healing of the wound surface of human body, while sodium hydroxide changes the wound surface nursed by polyvinyl alcohol fibers to be basic, which not only is not favorable to wound surface healing, but also generates a pH environment suitable for bacteria, thus increasing the risk of infection. Ash is made up of fine particles, which contain or adhere many substances harmful to human body, such as heavy metals.
4. A hydroxyl group-OH is a polar group, which can form a hydrogen bond with the water in the wound exudate and has good adsorption to water molecules, and acetate acetoxyl group-$OCOCH_3$ is an ester group and does not absorb water. It can be seen that, for medical dressings, the performance of —OH is far greater than that of —$OCOCH_3$, which requires a high degree of alcoholysis. When the PVA alcoholysis is high, the side groups —H and —OH are small in volume and can enter the crystallization site without causing stress, and thus hydroxyl groups in PVA macromolecules will associate with each other in the form of hydrogen bonds; since macromolecules are arranged orderly, water molecules are difficult to enter between PVA macromolecules, making a solvation difficult, thus resulting in a poor water solubility and stable performance. When PVA alcoholysis degree is low, due to the increase of —$OCOCH_3$, the association of hydrogen bonds is further weakened, and the orientation of PVA macromolecules is damaged, so that water molecules easily enter between PVA macromolecules, and the dissolving effect of water on PVA is improved. For dressings for nursing wounds, the presence of water in exudate increases the risk of foreign materials to remain on the wound surface.

Medical polyvinyl alcohol fibers not only need to meet mechanical and thermal properties, but also need to meet strict biological evaluation, so there is a need in the market for a preparation process which can avoid the use of mirabilite and produce PVA fibers with high purity and few impurities, and the invention solves such problems.

SUMMARY OF THE INVENTION

In order to solve the disadvantages of the prior art, the invention aims to provide a preparation method of PVA fibers, in which PVAc (polyvinyl acetate) is adopted to replace PVA, in combination with an electrolytic coagulation bath so that mirabilite is not needed in the coagulation bath, and PVA is obtained by the alcoholysis of PVAc in an electrolytic cell, and the produced PVA fibers present high purity and few impurities.

In order to achieve the above object, the invention adopts the following technical scheme:

A preparation method of PVA fiber comprises the following steps:

Step 1, preparing a spinning dope;

PVAc (polyvinyl acetate) is used as a raw material, and dissolved with addition of methanol before filtration, and then the spinning dope is obtained;

Step 2, spinning;

The spinning dope is injected into a spinneret, and the ejected fibers are brought into a direct current electrolytic cell, the PVAc undergoing a series of reactions of alcoholysis, electrolytic catalytic alcoholysis, and the levering of the alcohol; the solution formulation in the electrolytic coagulation bath comprising alkali, alcohol and water;

Step 3: acid bath;

The fiber passing through the electrolytic cell is placed into an acid solution with pH value of 4.5-6.9 for an acid bath;

Step 4: through stretching, drying, washing with water, crimping with hot water and packaging, a finished polyvinyl alcohol fiber product is formed.

According to the above-mentioned preparation method of the PVA fiber, a concentration ratio of the PVAc to the methanol in the spinning dope ranges from 15-80: 20-85.

According to the above-mentioned preparation method of the PVA fiber, the spinning dope comprises 40-45% parts of the PVAc by mass and 55-60% parts for the methanol by mass.

According to the above-mentioned preparation method of the PVA fiber,

Step 2, spinning;

the spinning stock solution is injected into a spinneret under the conditions of 0.05-0.6 MPa and 45-55° C. in temperature, and the ejected fibers are brought into a direct current electrolytic cell for coagulation bath, and undergo a series of reactions of alcoholysis, electrolytic catalytic alcoholysis and the levering of the alcohol; the solution formulation in the electrolytic coagulation bath comprising alkali, alcohol and water.

According to the above-mentioned preparation method of the PVA fiber, the preparation method of the acid solution comprises dissolving at least one acid in water at a temperature of 45-55° C., and adjusting the pH value of the acid solution to be 4.5-7.0.

According to the above-mentioned preparation method of the PVA fiber, the direct current voltage of the direct current electrolytic cell is 1.23V-200V.

According to the above-mentioned preparation method of the PVA fiber, the alkali includes: lithium hydroxide, sodium hydroxide, potassium hydroxide, rubidium hydroxide, cesium hydroxide, francium hydroxide, calcium hydroxide, strontium hydroxide, barium hydroxide, radium hydroxide, thallous hydroxide, silver diammonium hydroxide, choline, thallium hydroxide and $NR_4OH$.

According to the above-mentioned preparation method of the PVA fiber, the acid in the acid solution includes perchloric acid, hydroiodic acid, sulfuric acid, hydrobromic acid, hydrochloric acid, nitric acid, iodic acid oxalic acid, sulfurous acid, phosphoric acid, pyruvic acid, nitrous acid, carbonic acid, citric acid, hydrofluoric acid, malic acid, gluconic acid, formic acid, lactic acid, benzoic acid, acrylic acid, acetic acid propionic acid, stearic acid, hydrosulfuric acid, hypochlorous acid, and boric acid.

According to the above-mentioned preparation method of the PVA fiber, the alcohol includes:

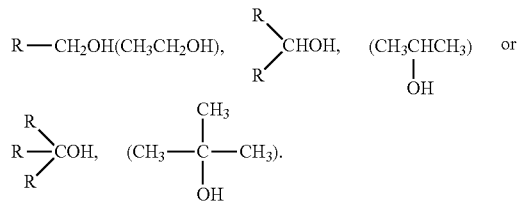

The invention has the advantages that:

PVAc (polyvinyl acetate) is adopted to replace PVA, in combination with an electrolytic coagulation bath so that a mirabilite is not needed in the coagulation bath, and PVA is obtained by the alcoholysis of PVAc in an electrolytic cell, and the produced PVA fibers present high purity and few impurities;

The following formula is used in the electrolytic cell: water, alkali and alcohol with a DC voltage of ≥1.23V in coagulation bath, in which the alcohol can be used as a lever to regulate esterification and alcoholysis;

During electrolysis, hydroxide ions are concentrated at a position connected to an electric plate of the positive electrode and metal ions are concentrated at an electric plate of the negative electrode; and if fibers can be fabricated from the position of the positive electrode, purity will be further improved and impurities will be reduced;

Acetate generated in the production process is electrolyzed to generate gas and alkali, thus further reducing impurities.

The acid bath can neutralize the basic residues on PVA fibers after the alcoholysis in electrolytic cell, and adjust the PVA fibers to be with weak acidity, which is more in line with the requirements of biocompatibility.

DETAILED DESCRIPTION OF EMBODIMENTS

The present invention will be described in detail below with reference to the drawings and specific embodiments.

Figure 1:
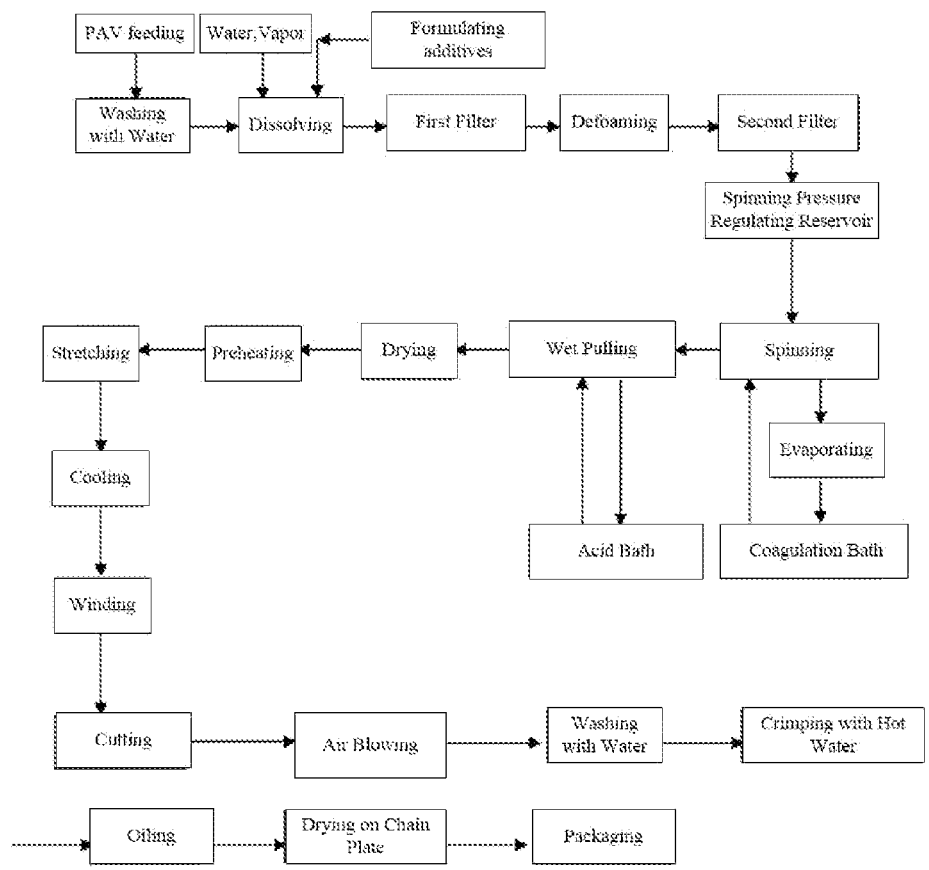
FIG. 1 is a preparation flow chart of the prior art.
Figure 2:
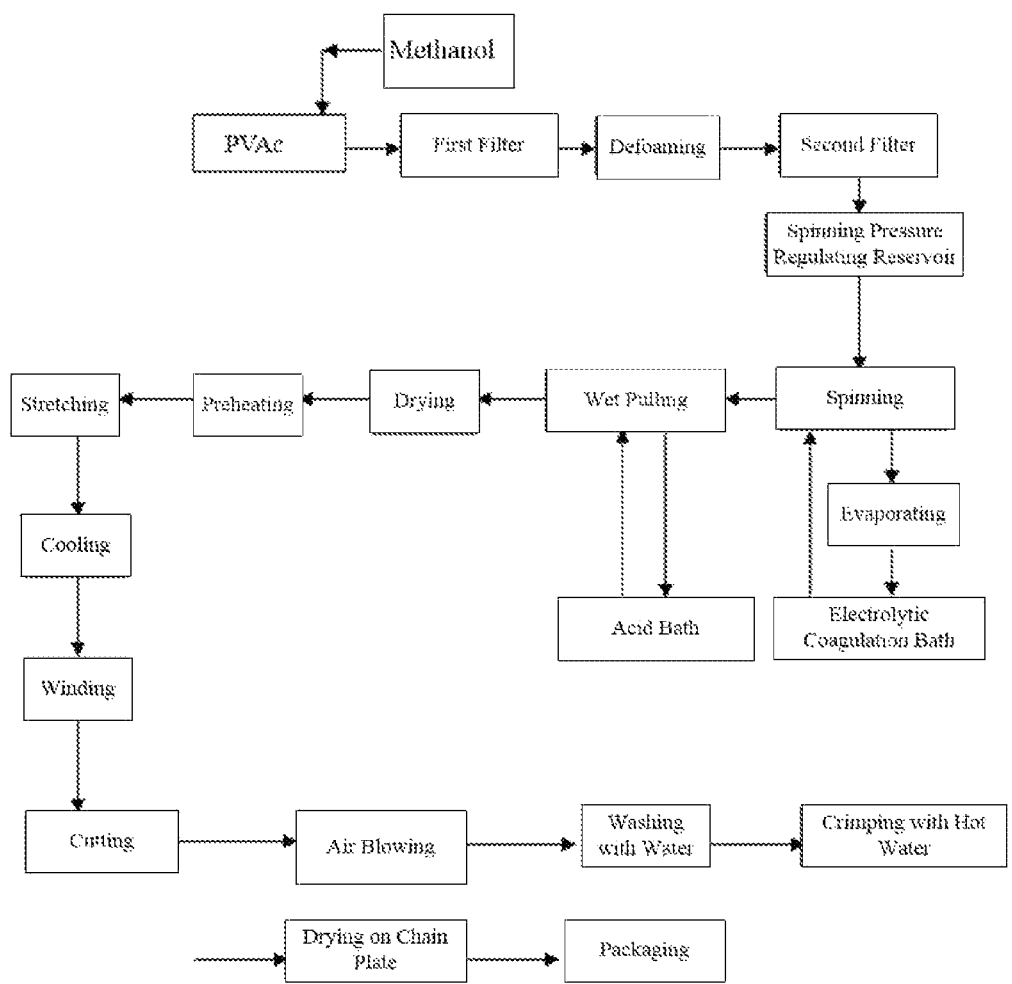
FIG. 2 is a preparation flow chart according to an embodiment of the present invention.

As shown in FIG. 2, a preparation method of PVA fiber includes the following:

Step 1, preparing a spinning dope;

PVAc is used as a raw material, and dissolved with addition of methanol before filtration, and then the spinning dope is obtained; As an example, a concentration ratio of the PVAc to the methanol in the spinning dope ranges from 15-80: 20-85; the spinning dope comprises 40-45% parts of the PVAc by mass and 55-60% parts for the methanol by mass.

Figure 3:
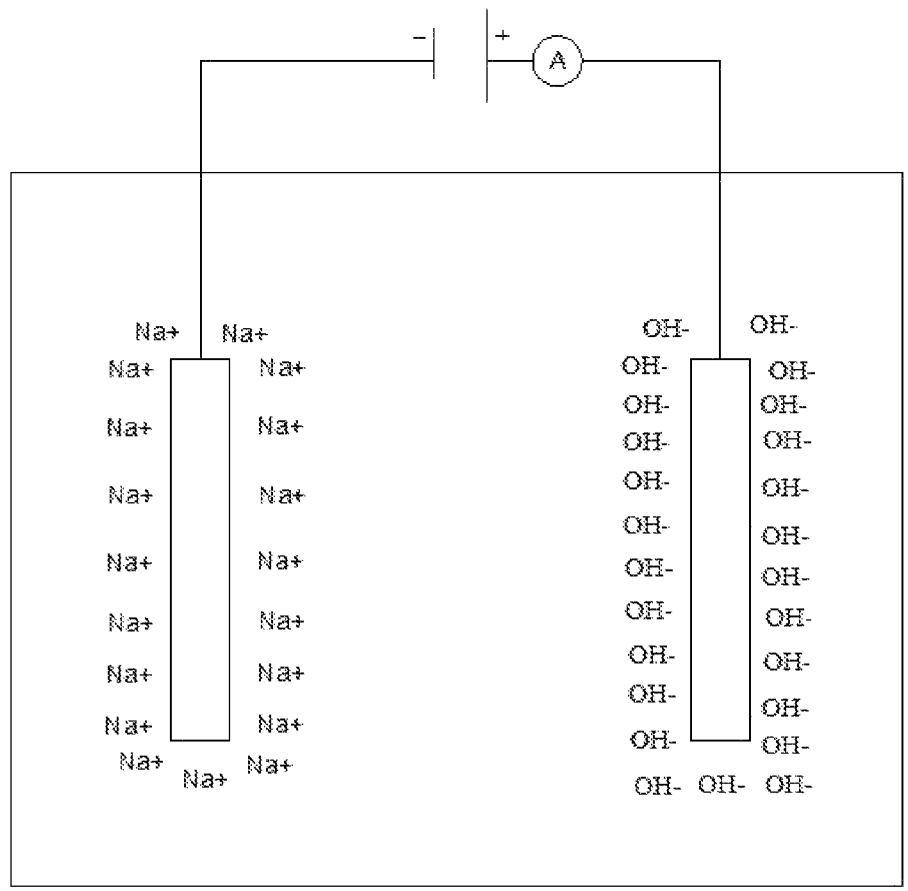
FIG. 3 is a schematic structural diagram of an embodiment of the electrolytic cell according to the present invention during operation.

Step 2, spinning;

The spinning stock solution is injected into a spinneret under the conditions of 0.05-0.6 MPa and 45-55° C. in temperature, and the ejected fibers are brought into a direct current electrolytic cell for coagulation bath, as shown in FIG. 3, with a direct current voltage of the direct current electrolytic cell of 1.23V-200V, and undergo a series of reactions of alcoholysis, electrolytic catalytic alcoholysis and the levering of the alcohol; and the solution formulation in the electrolytic coagulation bath comprises alkali, alcohol and water; the alkali includes: lithium hydroxide, sodium hydroxide, potassium hydroxide, rubidium hydroxide, cesium hydroxide, francium hydroxide, calcium hydroxide, strontium hydroxide, barium hydroxide, radium hydroxide, thallous hydroxide, silver diammonium hydroxide, choline, thallium hydroxide and $NR_4OH$. The alcohol includes:

$$R-CH_2OH(CH_3CH_2OH),\quad \begin{array}{c}R\\R'\end{array}\!\!\!CHOH,\quad (CH_3CHCH_3)\text{ or }\underset{OH}{|}$$

$$\begin{array}{c}R\\R'\\R''\end{array}\!\!\!COH,\quad (CH_3-\underset{OH}{\overset{CH_3}{\underset{|}{\overset{|}{C}}}}-CH_3).$$

Step 3: acid bath;

Fibers after the coagulation bath are placed into an acid solution with pH value of 4.5-7.0 for an acid bath, the preparation method of the acid solution comprises dissolving at least one acid in water at a temperature of 45-55° C., and adjusting the pH value of the acid solution to be 4.5-7.0. The acid in the acid solution includes perchloric acid, hydroiodic acid, sulfuric acid, hydrobromic acid, hydrochloric acid, nitric acid, iodic acid oxalic acid, sulfurous acid, phosphoric acid, pyruvic acid, nitrous acid, carbonic acid, citric acid, hydrofluoric acid, malic acid, gluconic acid, formic acid, lactic acid, benzoic acid, acrylic acid, acetic acid propionic acid, stearic acid, hydrosulfuric acid, hypochlorous acid, boric acid.

The following experiments verify the beneficial effects:

A finished fiber product was prepared according to the following examples:

Example 1

Step 1, 180 kilograms of polyvinyl acetate particles and 270 kilograms of methanol solution were respectively weighed and added into a reactor in an adding order of the polyvinyl acetate first and then the methanol, and the temperature was raised to 50° C., so that the polyvinyl acetate could be fully dissolved in the methanol solution. The concentration ratio of the PVAc to the methanol in spinning dope was 2:3.

The obtained PVAc/MT solution was filtered for the first time, defoamed and filtered for the second time, and then introduced into a spinning pressure regulating reservoir.

Step 2, Electrolyte

The electrolyte was obtained by adding 700 kg of water into an insulating electrolytic cell, and then 270 kg of potassium hydroxide solid and 30 kg of 99% isopropyl alcohol.

② Electrolytic Cell

According to a flow chart of the process, anode and cathode electrodes were formed in the electrolytic cell through the wires, and the electrode material was graphite.

A spinning was carried out in the spinning pressure regulating reservoir at a temperature of 50° C. with the pressure increased to 0.4 MPa. The pressurized spinning solution was injected into the spinneret, in which a diameter of the spinneret hole of the spinneret was generally 0.45 mm with an aspect ratio of 4.

Turn on the DC power supply, adjust the DC voltage to 20V, and bring the current intensity on the anode side of the electrolytic cell to 184 A/m2. PVAc/MT filaments ejected from the spinneret passed through the anode side of the electrolytic cell (the PVAc/MT filaments underwent a rapid alcoholysis due to the high concentration of hydroxide ions on the anode side). Pull outward at a speed of 6 meters per minute.

Enter the acid bath after wet pulling.

Step 3,

Add 500 kg of water into the acid bath and then 300 g of citric acid. Pull outward the PVA fibers entering the acid bath at a speed of 6 meters per minute.

Step 4,

Through stretching, drying, washing with water, crimping with hot water and packaging, a finished polyvinyl alcohol fiber product was formed.

Example 2

Step 1, 200 kilograms of polyvinyl acetate particles and 250 kilograms of methanol solution were respectively weighed and added into a reactor in an adding order of the polyvinyl acetate first and then the methanol, and the temperature was raised to 55° C., so that the polyvinyl acetate could be fully dissolved in the methanol solution. The concentration ratio of the PVAc to the methanol in spinning dope is 4:5.

The obtained PVAc/MT solution was filtered for the first time, defoamed and filtered for the second time, and then introduced into a spinning pressure regulating reservoir.

Step 2,

① Electrolyte

The electrolyte was obtained by adding 700 kg of water into the insulator electrolytic cell, and then 280 kg of potassium hydroxide and 20 kg of 99% alcohol.

② Electrolytic Cell

According to a flow chart of the process, anode and cathode electrodes were formed in the electrolytic cell through the wires, and the electrode material was graphite.

A spinning was carried out in the spinning pressure regulating reservoir at a temperature of 50° C. with the pressure increased to 0.4 MPa. The pressurized spinning solution was injected into the spinneret, in which a diameter of the spinneret hole of the spinneret was generally 0.45 mm with an aspect ratio of 4.

Turn on the DC power supply, adjust the DC voltage to 20V, and bring the current intensity on the anode side of the electrolytic cell to 184 $A/m^2$. PVAc/MT filaments ejected from the spinneret passed through the anode side of the electrolytic cell (the PVAc/MT filaments underwent a rapid alcoholysis due to the high concentration of hydroxide ions on the anode side). Pull outward at a speed of 6 meters per minute.

Enter the acid bath after wet pulling.

Step 3,

Add 500 kg of water into the acid bath and then 300 g of citric acid. Pull outward the PVA fibers entering the acid bath at a speed of 6 meters per minute.

Step 4, through stretching, drying, washing with water, crimping with hot water and packaging, a finished polyvinyl alcohol fiber product was formed.

Example 3

Step 1, 200 kilograms of polyvinyl acetate particles and 250 kilograms of methanol solution were respectively weighed and added into a reactor in an adding order of the polyvinyl acetate first and then the methanol, and the temperature was raised to 55° C., so that the polyvinyl acetate could be fully dissolved in the methanol solution. The concentration ratio of the PVAc to the methanol in spinning dope is 4:5.

The obtained PVAc/MT solution was filtered for the first time, defoamed and filtered for the second time, and then introduced into a spinning pressure regulating reservoir.

Step 2,

① Electrolyte

The electrolyte was obtained by adding 700 kg of water into the insulator electrolytic cell, and then 280 kg of potassium hydroxide and 20 kg of 99% alcohol.

② Electrolytic Cell

According to a flow chart of the process, anode and cathode electrodes were formed in the electrolytic cell through the wires, and the electrode material was graphite.

A spinning was carried out in the spinning pressure regulating reservoir at a temperature of 50° C. with the pressure increased to 0.5 MPa. The pressurized spinning solution was injected into the spinneret, in which a diameter of the spinneret hole of the spinneret was generally 0.45 mm with an aspect ratio of 4.

Turn on the DC power supply, adjust the DC voltage to 20V, and bring the current intensity on the anode side of the electrolytic cell to 184 A/m2. PVAc/MT filaments ejected from the spinneret passed through the anode side of the electrolytic cell (the PVAc/MT filaments underwent a rapid alcoholysis due to the high concentration of hydroxide ions on the anode side). Pull outward at a speed of 8 meters per minute.

Enter the acid bath after wet pulling.

Step 3,

Add 500 kg of water into the acid bath and then 300 g of citric acid. Pull outward the PVA fibers entering the acid bath at a speed of 8 meters per minute.

Step 4,

Through stretching, drying, washing with water, crimping with hot water and packaging, a finished polyvinyl alcohol fiber product was formed.

Example 4

Step 1, 200 kilograms of polyvinyl acetate and 250 kilograms of methanol are respectively weighed and added into a reactor in an adding order of the polyvinyl acetate first and then the methanol, and the temperature is raised to 55° C., so that the polyvinyl acetate can be fully dissolved in the methanol solution. The concentration ratio of the PVAc to the methanol in spinning dope is 4:5.

The obtained PVAc/MT solution was filtered for the first time, defoamed and filtered for the second time, and then introduced into a spinning pressure regulating reservoir.

Step 2,

① Electrolyte

The electrolyte was obtained by adding 700 kg of water into the insulator electrolytic cell, and then 280 kg of potassium hydroxide and 20 kg of 99% alcohol.

② Electrolytic Cell

According to a flow chart of the process, anode and cathode electrodes were formed in the electrolytic cell through the wires, and the electrode material was graphite.

A spinning was carried out in the spinning pressure regulating reservoir at a temperature of 50° C. with the pressure increased to 0.4 MPa. The pressurized spinning solution was injected into the spinneret, in which a diameter of the spinneret hole of the spinneret was generally 0.45 mm with an aspect ratio of 4.

Turn on the DC power supply, adjust the DC voltage to 16V, and bring the current intensity on the anode side of the electrolytic cell to 111 A/m$^2$. PVAc/MT filaments ejected from the spinneret passed through the anode side of the electrolytic cell (the PVAc/MT filaments underwent a rapid alcoholysis due to the high concentration of hydroxide ions on the anode side). Pull outward at a speed of 3 meters per minute.

Enter the acid bath after wet pulling.

Step 3,

Add 500 kg of water into the acid bath and then 300 g of citric acid. Pull outward the PVA fibers entering the acid bath at a speed of 3 meters per minute.

Step 4,

Through stretching, drying, washing with water, crimping with hot water and packaging, a finished polyvinyl alcohol fiber product was formed.

Δ Experiment 1: Test on the content of volatile in PVA fiber;

1 Scope

It was used for a method of determining of the volatile content in polyvinyl alcohol materials.

2 Principle

It was realized by calculating the mass loss of the sample heated at 105° C. for 3 hours.

3 Methods 3.1 Instruments 3.1.1 Thermostat: capable of keeping a temperature of (105±2) ° C. constant.

3.1.2 Weighing bottle: 60 mm*30 mm; with a material of stainless steel.

3.1.3 Balance: a sensitivity of 0.001 g.

3.1.4 Dryer: Silicone as a desiccant.

3.2 Operation

Put the weighing bottle (with a cap) into a thermostat at (105±2) ° C. and heat it for 1 hour, then put it in the dryer and cool it to the room temperature, an then weigh it to an accuracy of 0.001 g. Cut 5 g of the PVA fiber, spread it evenly on a bottom of the weighing bottle, cover the cap, and weigh it to an accuracy of 0.001 g. Put it into the thermostat with a temperature of (105±2) ° C. (remove the cap and put it in the thermostat), heat it for 3 hours (±5 min), take it out, and cool it to the room temperature in a dryer, and then weigh it to an accuracy of 0.001 g.

4. Calculation and Expression of Results

The volatile content was calculated according to the following formula:

$$X = \frac{m_1 - m_2}{m_1 - m_0} \times 100$$

Where: X—volatile (%);
m₀—the weight of the weighing bottle (g)
$m_1$—the mass (g) of the sample with the weighing bottle before drying;
$m_2$—mass (g) of the sample with the weighing bottle after drying;
the arithmetic mean of results of the parallel tests was taken as the testing result, taken to one decimal place.

4.1 Admissible Error
The difference between the two values of parallel test results was not more than 0.2%.

5 Test Report:
a) the experimental method in the experimental report was based on GB/T12010.2;
b) the testing sample was PVA fiber.
d) taking the sample obtained in Example 2 as an example, the volatile content was 4.4%.

$$X_1 = \frac{56.8821 - 56.6591}{56.8821 - 51.8820} \times 100 = 4.4599\%$$

$$X_2 = \frac{56.7850 - 56.5632}{56.7850 - 51.7851} \times 100 = 4.4360\%$$

$$X = \frac{X_1 + X_2}{2} = 4.4\%$$

e) taking the sample obtained in example 2 as an example, the measurement result is as follows: the volatile content was calculated according to the following formula:
$m_0$—the weight of the weighing bottle 51.8820 g; 51.7851 g;
$m_1$—the mass (g) of the sample with the weighing bottle before drying 56.8821 g; 56.7850 g;
$m_2$—the mass (g) of the sample with the weighing bottle after drying 56.6591 g; 56.5632 g;
the arithmetic mean of results of the parallel tests was taken as the testing result, taken to one decimal place.

f) admissible error
The difference between the two values of parallel test results was not more than 0.2%; and the test results of other samples were shown in Table 1.

Δ Experiment 2: Test on the content of the sodium acetate in PVA fiber;

1 Scope
The content of the sodium acetate was determined by a chemical titration method or conductivity method. Due to the interference of additives, these methods were not applicable to polyvinyl alcohol materials containing additives.

2 Principle
2.1 Titration Method
The sample was dissolved in water, the mixed solution of methylene blue and dimethyl yellow was used as an indicator, then the titration was made with hydrochloric acid, and then the content of the sodium acetate could be calculated.

3 Titration Method
3.1 Reagent
3.1.1 Hydrochloric acid standard titration solution: c (HCl)=0.1 mol/L.
3.1.2 Mixed Indicator of Methylene Blue and Dodecyl Yellow: 1:1.
Note: the Methylene Blue and the Dimethyl Huang Jun were 0.1% ethanol solution.

3.2 Instruments
3.2.1 Erlenmeyer flask: 500 mL, with a stopper.
3.2.2 Cylinder: 200 mL, with a division value of 2 mL.
3.2.3 Burette: 50 mL, with a division value of 0.1 mL.

3.3 Operating Steps
3.3.1 Weigh about 5 g of sample, to an accuracy of 0.001 g; put it into the erlenmeyer flask with 200 mL of water added, and then heat it to dissolve.
3.3.2 After the sample was dissolved, cool it down and add 15~20 drops of the mixed indicator of methylene blue and dimethyl yellow, and then make the titration with the 0.1 mol/L hydrochloric acid standard titration solution to the end point. At the end point, the color of the solution changed from green to lavender. Carry out a blank test.
Note: samples with low alcoholysis degree might sometimes make the solution turbid. Once this happened, slowly cool the solution with a gentle stirring, or replace the aqueous solution with a 3:1 water/methanol mixed solution.

3.3.4 Results
The content of the sodium acetate was measured by mass fraction NaAc, and the numerical value was expressed by %, and calculated according to the formula:

$$NaAc = \frac{(u1 - u0) \times c \times 0.08203}{m} \times 100$$

Where:
u1—the numerical value of the volume of the hydrochloric acid standard titration solution consumed by the titration of the sample, in milliliters (mL);
u0—the numerical value of the volume of the hydrochloric acid standard titration solution consumed by the titration of the blank, in milliliters (mL);
c—the accurate numerical value of the concentration of the hydrochloric acid standard titration solution, in moles per liter (mol/L);
0.08203—the molar mass of sodium acetate divided by 1,000 in grams per mole (g/mol);
m—the numerical value of the mass of the sample in grams (g).
Calculate the arithmetic mean of the two measurement results, to the second digit below the decimal point.
Note: If sodium hydroxide is present in the sample, attention should be paid to its influence on the measurement of sodium acetate content; however, when referring to the ash calculation, the influence would not be considered.

5 Test Report
a) the experimental method in the experimental report was based on GB/T12010.2;
b) the testing sample was PVA fiber.
c) taking the sample obtained in Example 2 as an example, the measurement result was 0.24%;
D) each single measurement result was 0.21%, 0.23%, 0.25%, 0.24%; and other sample's measurement results were shown in table 1.

Δ Experiment 3: Test on the content of ash in PVA fiber;
1 Scope
It is used for a method of determining of the ash content in polyvinyl alcohol materials.
2 Principle
The ash content was calculated based on the determined sodium acetate content, and expressed in sodium oxide.

3 Calculation

The ash content was measured by mass fraction Ash, and the numerical value was expressed by % and calculated according to the formula:

$$Ash = NaAc \times 0.378$$

Where:

NaAc—the numerical value of the sodium acetate content, %.

0.378—the coefficient at which the mass of sodium acetate was converted into that of sodium oxide.

Calculate the arithmetic mean of the two measurement results, to the second digit below the decimal point.

4 Test Report a) the experimental method in the experimental report was based on GB/T12010.2;

b) the testing sample was PVA fiber.

c) taking the sample obtained in Example 2 as an example, the ash content in the PVA fiber was determined to be 0.05%;

D) taking the sample obtained in Example 2 as an example, each single measurement result was 0.05%, 0.04%, 0.04%, 0.05%; and other sample's measurement results were shown in table 1.

Δ Experiment 4, Test on the alcoholysis degree (residual acetate) content in PVA fiber;

1 Scope

This reporting method was applicable to the case that did not contain additives, fillers, dyes and other substances that may interfere with the determination of this method. if these interferences existed, they must be separated by methods approved by all parties to the contract. The method was applicable to polyvinyl alcohol materials with an alcoholysis degree greater than 70% (mole fraction).

2 Terms and Definitions 2.1 Alcoholysis Degree

It was defined as the mole fraction of vinyl alcohol units in polyvinyl alcohol materials, in %, which is given in the formula:

$$\text{Alcoholysis Degree} = \frac{\text{Content of Vinyl Alcohol units}}{\text{Content of Vinyl Alcohol units} + \text{Content of Vinyl Acetate units}} \times 100$$

3 Principle

It was realized by the following steps: dissolving the sample in water, adding a quantitative amount of sodium hydroxide to react with residual acetate in polyvinyl alcohol material, and then adding a quantitative amount of sulfuric acid to neutralize the residual sodium hydroxide with the excess sulfuric acid titrated with the sodium hydroxide standard titration solution, and calculating the content and alcoholysis degree of residual acetate.

4 Reagent;

4.1 sodium hydroxide standard titration solution: c(NaOH)=0.1 mol/L, 0.5 mol/L 4.2 sulfuric acid standard titration solution: c(½H$_2$SO$_4$)= 0.1 mol/L, 0.5 mol/L 4.3 hydrochloric acid standard titration solution: c(HCL)= 0.1 mol/L, 0.5 mol/L 4.4 Phenolphthalein Solution: 10 g/L ethanol (90%) Solution.

5 Instruments 5.1 Erlenmeyer flask: 500 mL, with a stopper.

5.2 Burette: 50 mL, with a division value of 0.1 mL.

5.3 Cylinder: 200 mL, with a division value of 1 mL.

5.4 Dissolution equipment: capable of heating and stirring.

5.5 Balance: a sensitivity of 0.001 g.

6 Operating Steps 6.1 Weigh the sample, to an accuracy of 0.001 g, and put it into the erlenmeyer flask.

6.2 Add 200 mL of water and 3 drops of phenolphthalein solution, and if it turned to be pink, add 5 mL of 0.1 mol/L sulfuric acid. Place it in dissolving equipment and heat until the sample was completely dissolved, and open the erlenmeyer flask to allow volatile organic compounds to escape.

6.3 Cool the solution to the room temperature and titrate it to pink with sodium hydroxide standard titration solution. Accurately add 25.00 ml of sodium hydroxide standard titration solution specified in 4.1 section, and cover the erlenmeyer flask and shake well. Leave the solution at room temperature for more than 2 h (or boil under reflux for 30 min).

6.4 Add 25.00 mL of sulfuric acid or hydrochloric acid with the same concentration as the sodium hydroxide standard titration solution, and cover the erlenmeyer flask and shake well.

6.5 Titrate the excess sulfuric acid or hydrochloric acid to the pink endpoint with the same concentration of sodium hydroxide standard titration solution.

6.6 Carry out blank tests according to steps 6.2 to 6.5 respectively.

Amount of the sample and concentration of the standard solution used

| Estimated value of the alcoholysis degree (mole fraction)% | The amount of the sample/g | concentration of the standard solution/(mol/L) |
|---|---|---|
| Alcoholysis degree ≥ 97 | 3 | 0.1 |
| 90 ≤ alcoholysis degree < 97 | 3 | 0.5 |
| 80 ≤ alcoholysis degree < 90 | 2 | 0.5 |
| 70 ≤ alcoholysis degree < 80 | 1 | 0.5 |

7 Results

The alcoholysis degree was measured by mole fraction H, and the numerical value was expressed by % and calculated according to the formula:

$$X1 = \frac{(U1 - U0) \times c \times 0.06005}{m \times \left(1 - \frac{vm + NaAc}{100}\right)} \times 100$$

$$X2 = \frac{44.05 X1}{60.05 - 0.42 X1}$$

$$H = 100 - X2$$

Where:

X1—the numerical value of the acetic acid content corresponding to residual acetate, by mass fraction, %;

X2—the numerical value of the content of residual acetate, by mole fraction, %;

U1—the numerical value of the volume of the sodium hydroxide standard titration solution consumed by the titration of the sample, in milliliters (mL);

U0—the numerical value of the volume of the sodium hydroxide standard titration solution consumed by the titration of the blank, in milliliters (mL);

c—the accurate numerical value of the concentration of the sodium hydroxide standard titration solution, in moles per liter (mol/L);

0.06005—the molar mass of acetic acid divided by 1,000 in grams per mole (g/mol);

m—the numerical value of the mass of the sample in grams (g);

vm—the numerical value of volatile content in polyvinyl alcohol resin, by mass fraction, %;

NaAc—the numerical value of sodium acetate content in polyvinyl alcohol resin, by mass fraction, %;

44.05—the molar mass of polyvinyl alcohol resin links, in grams per mole (g/mol);

60.05—the molar mass of acetic acid in grams per mole (g/mol);

0.42—the converting coefficient according to the following equation:

$$X1 = \frac{60.05 X2}{86.09 X2 + (100 - X2) \times 44.05}$$

Where:
86.09—the molar mass of vinyl acetate in grams per mole (g/mol).

Calculate the arithmetic mean of the two measurement results, to the second digit below the decimal point.

8 Test Report
a) the experimental method in the experimental report was based on GB/T12010.2;
b) the testing sample was PVA fiber.
c) taking the sample obtained in Example 2 as an example, the measurement result was that the alcoholysis degree of the PVA fiber was 99.9%;
D) each single measurement result was 99.9%, 99.9%, 99.9%; and other sample's measurement results were shown in table 1.

Δ Experiment 5: Test on the pH value of PVA fiber;

1 Scope

It was used to determine the pH value of the aqueous solution of polyvinyl alcohol material with an acidimeter. It was applicable to measure the pH value of 4% aqueous solution of polyvinyl alcohol material with an alcoholysis degree greater than 70% (mole fraction).

2 Principle

It was realized by immersing the specified an indicator electrode and a reference electrode into the same solution to be measured to form a primary cell, whose electromotive force was related to the pH value of the solution, and thus the pH value of the solution could be obtained by measuring the electromotive force of the primary cell.

3 Reagent

The reagents and water used were analytical reagents and grade C water in GB/T6682, respectively.

3.1 Phthalate standard buffer solution which was prepared according to GB/T9724.

3.2 Phosphate standard buffer solution which was prepared according to GB/T9724.

3.3 Borate standard buffer solution which was prepared according to GB/T9724.

3.4 Water without carbon dioxide which was prepared according to GB/T603.

4 Instruments 4.1 Acidimeter: meet the requirement of 0.02 in 4.7 section of JJG119-2005.

4.2 Balance: with a sensitivity of 0.001 g.

4.3 Erlenmeyer flask: 500 ml.

4.4 Beaker: 100 ml.

4.5 Dissolution equipment: capable of heating and stirring.

4.6 Thermometer: with a sensitivity of 1° C.

5 Operating Steps 5.1 Formulation of the 4% Aqueous Solution of Polyvinyl Alcohol 5.1.1 Weigh about 15 g of the sample, to an accuracy of 0.001 g, and put it into the erlenmeyer flask of 500 ml.

5.1.2 Calculate the amount of water to be added according to formula (1) and add the water for modulation.

$$m = \frac{m_0 \times (100 - w)}{4} - m_0$$

Where:
$m_0$—the numerical value of the mass of the weighed sample in grams (g);
m—the numerical value of added water in grams (g);
w—the numerical value of volatile content in the sample, %;
4—the numerical value of specified solution concentration expressed in %.

5.1.3 Heat and dissolve the sample completely, and cool it down to the room temperature to obtain the testing solution for later use.

Note: The quality of the test solution before and after sample dissolution should be consistent.

5.2 Determination 5.2.1 Correct the pH meter with a standard buffer solution (4.1 or 4.2 or 4.3) according to the operating instructions of the pH meter.

5.2.2 Place 50 ml of the testing solution (6.1) in a beaker, insert the electrode in the solution, shake it carefully to make it uniform, and record the pH value after the reading is stable.

5.2.3 Immediately after the test, the electrode should be cleaned carefully with water.

Note: After flushing the electrode, use clean filter papers to gently suck the water droplets at the bottom of the electrode, and pay attention not to wipe the electrode with filter paper, so as to avoid electrostatic charges on the electrode, which might lead to an unstable reading and even damage the electrodes.

$$m = \frac{m_0 \times (100 - w)}{4} - m_0$$

5.2.4 Formula
5.2.5 Calculation
5.2.5.1
The first set of data measured by experiment:
$m_0$=3.9995 g m=96 g
It could be obtained when substituting them in the formula $$m = \frac{m_0 \times (100 - w)}{4} - m_0$$

-continued $$96 = \frac{3.9995 - (100 - w)}{4}$$

$w \approx 4.0$ 5.2.5.2

The second set of data measured by experiment:

$m_0$=4.9994 g m=96 g

It could be obtained when substituting them in the formula $$m = \frac{m_0 \times (100 - w)}{4} - m_0$$

$$96 = \frac{4.0004 - (100 - w)}{4}$$

$w \approx 4.1$

6 Results

Take the arithmetic mean of parallel measurement results as the measurement results, which were taken accurate to the first digit below the decimal point.

Taking the sample obtained in Example 2 as an example, the absolute difference between the two parallel measurement results (pH value) was not more than 0.3.

7 Test Report a) the experimental method in the experimental report was based on GB/T12010.4;

b) the testing sample was PVA fiber.

c) type and model of instrument used (SX723 type) pH/mV/conductivity tester;

d) taking the sample obtained in Example 2 as an example, the measured pH value of PVA fiber was 6.50-6.75;

e) the two pH values of PVA fibers measured in two times were: pH=6.70, pH=6.74, respectively; the comprehensive results of other sample's tests were shown in Table 1.

Δ Experiment 6: Test on the average polymerization degree of PVA fiber;

1 Scope

It was used for a method of measuring the intrinsic viscosity of aqueous solution of polyvinyl alcohol materials by using an Ostwald viscosimeter and calculating the average polymerization degree of polyvinyl alcohol materials from the intrinsic viscosity. It is applicable to measure the average polymerization degree of polyvinyl alcohol materials with an alcoholysis degree greater than 70% (mole fraction).

2 Normative references

Chemical reagent—Preparations of reagent solutions for use in test methods in GB/T603;

Water for analytical laboratory use—Specification and test methods in GB/T6682.

3 Principle

The intrinsic viscosity of polyvinyl alcohol aqueous solution was measured, based on which the average polymerization degree of polyvinyl alcohol material was calculated.

4 Reagent

The reagents and water used were derived from analytical reagents and grade C water in GB/T6682, respectively.

4.1 Methanol.

4.2 sodium hydroxide solution: F (NaOH)-12.5 moL/L.

Methods: 500 g sodium hydroxide was weighed, dissolved in water and diluted to 1000 ml.

4.3 phenolphthalein: 10 g/L ethanol solution.

5 Instruments 5.1 Ostwald viscosimeter.

5.2 Glass-fritted funnel: P100 Sintered Glass.

5.3 Buchner funnel: with a diameter of 100 mm 5.4 Filter flask: 1 L.

5.5 Oven: capable of keeping a temperature of (105±2) ° C. constant.

5.6 Stopwatch: with a sensitivity of 0.1 s.

5.7 Constant temperature water bath: (30.0±0.1) ° C.

5.8 Pipette: 10 ml.

5.9 Dryer: Silicone as a desiccant.

5.10 Beaker: 500 ml.

5.11 Evaporating dish: with a capacity of 60 ml~100 ml.

5.12 Water Bath: with a sensitivity of 1° C.

5.13 Erlenmeyer flask: 100 ml, 500 ml.

5.14 Dissolution equipment: capable of heating and stirring.

5.15 Weighing bottle: 60 mm×30 mm.

5.16 Balance, with a sensitivity of 0.0001 g.

5.17 Balance: with a sensitivity of 0.1 g.

6 Operating Steps 6.1 Sample Treatment 6.1.1

Weigh 10 g of sample, accurate to 0.1 g, place it in a 500 ml of erlenmeyer flask, add 200 mL of methanol, and then add 3 ml of sodium hydroxide solution to the sample with an alcoholysis degree above 97% (mole fraction), add 10 ml of sodium hydroxide solution to the sample with an alcoholysis degree less than 97% (mole fraction), and mix evenly after adding.

6.1.2 Place the sample (6.1.1) in a water bath at a temperature of (40±2) ° C. and heat it for 1 h.

6.1.3 Filter the heated sample (6.1.2) with a Buchner funnel with a filter cloth laid in place, wash the sample with methanol (4.1), and remove sodium hydroxide and sodium acetate (check, with phenolphthalein, the alkaline reaction of the washing solution which was diluted two times with water). And then transfer to a watch glasses, and dry at a temperature of (105±2) ° C. for 1 h.

Note: For the polyvinyl alcohol with an alcoholysis degree greater than 99.8% (mole fraction), 3 g of sample was weighed, accurate to 0.1 g, moved into a 500 ml beaker, add then stirred with the addition of 200 ml of water, and laid aside for 15 min, and then washed with water. Filter the placed sample with a Buchner funnel with a filter cloth laid in place, and after a complete dehydration, wash the sample with 500 ml of water in 3~4 times, and clean sodium hydroxide and sodium acetate as much as possible and suck them dry.

6.2 Sample Dissolution

Weigh 3 g of the sample treated according to 6.1, accurate to 0.1 g, and put it into a 500 ml beaker, add about 300 ml of water, and put it on a dissolving device for heating and dissolving; after all the samples were dissolved, cool it to the room temperature. Filter the solution with a Pm Glass-fritted funnel with a dry ground erlenmeyer flask receiving filtrate; place the erlenmeyer flask in a constant temperature water bath at a temperature of (30.0±0.1) °C. for at least 10 min, and keep the test solution at a constant temperature for later use.

6.3 Determination of the Concentration of the Testing Solution 6.3.1 Clean the weighing bottle in advance, and put it into a drying oven with a constant temperature of (105±2) °C. to heat and dry it for more than 1 hour, and then place it into a dryer, cool it to the room temperature, and weigh it to an accuracy of 0.0001 g.

6.3.2 Accurately suck 10 ml of the testing solution (6.2) with a 10 mL pipette and place it in the weighed weighing bottle (6.3.1), dry the weighing bottle in the drying oven with a constant temperature (105±2) °C. for more than 4 hours, and then take it out and place it in a dryer, cool it to the room temperature, and weigh it to an accuracy of 0.0001 g.

6.3.3 Calculate the concentration of the testing solution according to formula (1):

$$\rho = \frac{m \times 1000}{V}$$

Where:

P—the numerical value of the concentration of the testing solution in grams per liter (g/L);

m—the numerical value of the mass of the sample after the evaporation of the testing solution in grams (g);

V—the numerical value of the volume of 10 ml pipette at 30° C. in milliliters (mL).

6.4 Determination of the viscosity of the testing solution

Install the dried and cleaned viscometer in a constant temperature water bath at a temperature of (30.0±0.1) °C. to keep a capillary in a vertical direction. Accurately suck 10 ml of the testing solution with a 10 ml pipette and lay it aside for 5 min~10 min Connect one side D of the capillary with a hose, then suck the testing solution with a rubber suction bulb beyond the scale A of the capillary, make it fall naturally, and measure the flow time of its meniscus from the scale A to the scale B. Repeat the measurement until the difference between the three measurement results did not exceed 0.2 s, and take the mean as the flowing time of the testing solution.

6.5 Blank Test

Take 10 ml of water with the same temperature as the testing solution into a viscometer using a 10 ml pipette, measure the flowing time of water from scale A to scale B as the steps of 6.4, and repeat the measurement until the difference between the three measurement results did not exceed 0.2 s and take the mean as the flowing time of water.

7 Results

The average polymerization degree PA is calculated according to the formulas (2), (3) and (4):

$$lg\overline{P_A} = 1.613 \times lg\frac{[n] \times 10^4}{8.29}$$

$$[n] = \frac{2.303 \times lgn_\varepsilon}{\rho}$$

$$n_\varepsilon = \frac{t}{t_o}$$

Where:

[n]—the numerical value of the intrinsic viscosity of polyvinyl alcohol solution in liters per gram (L/g);

$n_\varepsilon$—the numerical value of a relative viscosity;

p—the numerical value of the concentration of the testing solution in gram per liter (g/L);

t—the numerical value of the flowing time of the testing solution in second (s);

$t_0$—the numerical value of the flowing time of water in second (s);

Take the arithmetic mean of parallel measurement results as the measurement results, and round off the numerical value of the polymerization degree to ten digits.

The absolute difference between the two parallel test results was not more than 50.

8 Test Report a) the experimental method in the experimental report was based on GB/T12010.4;

b) the testing sample was PVA fiber.

c) the mean of results for a single measurement of the average polymerization degree of PVA fiber was 2500.

d) Taking the test results of the sample of Example 2 as an example, the average polymerization degree of PVA fiber was determined as 2445, 2445, 2445, 2505 and 2505 in a single test, and the average test results of other samples are shown in Table 1.

Δ Experiment 7: Test on the sodium hydroxide content in PVA fiber;

1. Scope

It was used for the method of determining the content of sodium hydroxide in PVA fiber with a titration method.

It was applicable to determine the content of sodium hydroxide in PVA fiber with an alcoholysis degree greater than 70% (mole fraction).

2. Normative References

Partial terms of GB/T12010.

Chemical reagent—Preparations of standard volumetric solution in GB/T601.

Chemical reagent—Preparations of reagent solutions for use in test methods in GB/T603.

Water for analytical laboratory use—Specification and test methods in GB/T6682.

3 Principle

It was realized by dissolving PVA fiber in water, adding sulfuric acid in excess to neutralize sodium hydroxide in the sample with excessive sulfuric acid titrated with the sodium hydroxide standard titration solution, and calculating the content of sodium hydroxide in the sample.

The reaction equation was:

$2NaOH+H_2SO_4 \rightarrow Na_2SO_4+2H_2O$

4 Reagent

The reagents and water used refer to analytical reagents and grade C water in GB/T6682, respectively.

The standard solutions, preparations and products used are prepared according to GB/T601 and GB/T603, unless otherwise indicated.

4.1 Sulfuric acid standard titration solution:

$c\left(\frac{1}{2}H_2SO_4\right) = 0.1$ mol/L 4.2 Sodium hydroxide standard titration solution: c(NaOH)=0.1 mol/L 4.3 Phenolphthalein: 10 g/L ethanol solution.

5 Instruments
5.1 Balance: with a sensitivity of 0.001 g.
5.2 Erlenmeyer flask: 500 ml.
5.3 Burette: 10 ml, with a sensitivity of 0.05 ml.
5.4 Cylinder (dosing cup): 200 ml.
5.5 Dissolution equipment: capable of heating and stirring.
6 Operating Steps
Weigh 3 g of PVA fiber, to an accuracy of 0.001 g and transfer it into a 500 ml of erlenmeyer flask, add 200 ml of water and then 1-2 drops of phenolphthalein solution (4.3), followed by accurately adding 5.00 ml of sulfuric acid standard titration solution (4.1), and put the erlenmeyer flask into the dissolving equipment, and heat it to completely dissolve the sample. Take the erlenmeyer flask out after the sample was dissolved, and titrate, after cooling, with sodium hydroxide standard titration solution (4.2) until the testing solution turned to be pink with no color fading for 30 s as an end point, and carry out a blank test at the same time.
7 Results
The content of the sodium hydroxide was measured by mass fraction, and the numerical value was expressed by % and calculated according to the formula:

$$w = \frac{[(V_0 - V_1)/1000]cM}{m} \times 100$$

Where:
$V_0$—the numerical value of the volume of the sodium hydroxide standard titration solution consumed by the titration of the blank in milliliters, 5.400235 (mL);
$V_1$—the numerical value of the volume of the sodium hydroxide standard titration solution consumed by the titration of the sample in milliliters, 5.4 (mL);
c—the accurate numerical value of the concentration of the sodium hydroxide standard titration solution in moles per liter, 0.95 (mol/L);
m—the numerical value of the mass of the sample in grams, 3 (g);
M—the numerical value of the molar mass of sodium hydroxide in grams per mole (g/mol) (M=40.00).
Take the arithmetic mean of parallel measurement results as the measurement results, which were taken accurate to the second digit below the decimal point.
The absolute difference between the two parallel determining results was not more than 0.02%.
8 Test Report
a) the standard was from GB/T12010.7-2010;
b) the testing sample was PVA fiber.
c) type and model of instruments used;
SYS-02 Automatic Potential Titrator.
d) Taking the sample of Example 2 as an example to carry out the following calculation, the determination result was not more than 0.03%, and the average experimental results of other samples were shown in Table 1;

$$w_1 = \frac{[(5.40023 - 5.4)/1000]}{3} \times 0.95 \times 40 \times 100 \approx 0.0291\%$$

$$w_{12} = \frac{[(5.40024 - 5.4)/1000]}{3} \times 0.95 \times 40 \times 100 \approx 0.03\%$$

The comprehensive testing results of the above seven experiments were as follows:

|  | Volatile content (%) | Sodium acetate (%) | Ash (%) | Alcoholysis degree (%) | pH Value | Average degree of polymerization | The content of Sodium hydroxide |
|---|---|---|---|---|---|---|---|
| Example 1 | 4.4 | 0.23 | 0.04 | 99.9 | 6.74 | 2445 | 0.0292 |
| Example 2 | 4.1 | 0.22 | 0.04 | 99.9 | 6.74 | 2445 | 0.0291 |
| Example 3 | 4.3 | 0.23 | 0.04 | 99.9 | 6.74 | 2445 | 0.0290 |
| Example 4 | 4.0 | 0.21 | 0.04 | 99.9 | 6.60 | 2450 | 0.0286 |

Experiments showed that the alcoholysis degree of the polyvinyl alcohol for the PVA fiber obtained by the method of the invention turned out to the highest of 99.9%, the polymerization degree of all samples were more than 1445 with the highest of 1505; the pH value is 5.50-6.95 with the volatile content being ≤5%, sodium hydroxide residue being ≤0.02% and Ash residue being ≤0.06%, which demonstrated that the alcoholysis degree, polymerization degree, pH, volatile content, sodium hydroxide residue and ash residue could be effectively controlled through the process improvement, which is more suitable for medical use.

The above shows and describes the basic principles, main features and advantages of the present invention. It should be understood by those skilled in the art that the above-mentioned embodiments do not limit the present invention in any way, and all technical schemes obtained by equivalent substitution or equivalent transformation fall within the scope of protection of the present invention.

What is claimed is:
1. A preparation method of polyvinyl alcohol (PVA) fiber comprising the following steps:
step 1, preparing a spinning dope;
PVAc is used as a raw material, and dissolved with addition of methanol before filtration, and then the spinning dope is obtained;
step 2, spinning;
the spinning dope is injected into a spinneret, and the ejected fibers are brought into a direct current electrolytic cell, the PVAc undergoing a series of reactions of an alcoholysis, an electrolytic catalytic alcoholysis, and a levering of the alcohol; the solution formulation in an electrolytic coagulation bath comprising alkali, alcohol, and water;
step 3: acid bath;
the fiber passing through the electrolytic cell is placed into an acid solution with pH value of 4.5-6.9 for an acid bath;
step 4: forming a finished polyvinyl alcohol fiber product by stretching, drying, washing with water, crimping with hot water and packaging.
2. The preparation method of PVA fiber according to claim 1, wherein a concentration ratio of the PVAc to the methanol in the spinning dope ranges from 15-80 to 20-85.

3. The preparation method of PVA fiber according to claim 2, wherein the spinning dope comprises 40-45% parts of the PVAc by mass and 55-60% parts for the methanol by mass.

4. The preparation method of PVA fiber according to claim 1, wherein:
Step 2, spinning;
the spinning dope is injected into the spinneret under the conditions of 0.05-0.6 MPa and 45-55° C. in temperature, and the ejected fibers are brought into the direct current electrolytic cell for a coagulation bath, and undergo a series of reactions of an alcoholysis, an electrolytic catalytic alcoholysis and a levering of the alcohol; the solution formulation in the electrolytic coagulation bath comprising alkali, alcohol and water.

5. The preparation method of PVA fiber according to claim 1, wherein a preparation method of the acid solution comprises dissolving at least one acid in water at a temperature of 45-55° C., and adjusting the pH value of the acid solution to be 4.5-6.9.

6. The preparation method of PVA fiber according to claim 1, wherein a direct current voltage of the direct current electrolytic cell is 1.23V-200V.

7. The preparation method of PVA fiber according to claim 1, wherein the alkali comprises: lithium hydroxide, sodium hydroxide, potassium hydroxide, rubidium hydroxide, cesium hydroxide, francium hydroxide, calcium hydroxide, strontium hydroxide, barium hydroxide, radium hydroxide, thallous hydroxide, silver diammonium hydroxide, choline, thallium hydroxide and NR$_4$OH.

8. The preparation method of PVA fiber according to claim 1, wherein the acid in the acid solution comprises perchloric acid, hydroiodic acid, sulfuric acid, hydrobromic acid, hydrochloric acid, nitric acid, iodic acid oxalic acid, sulfurous acid, phosphoric acid, pyruvic acid, nitrous acid, carbonic acid, citric acid, hydrofluoric acid, malic acid, gluconic acid, formic acid, lactic acid, benzoic acid, acrylic acid, acetic acid propionic acid, stearic acid, hydrosulfuric acid, hypochlorous acid, boric acid.

9. The preparation method of PVA fiber according to claim 1, wherein the alcohol comprises:

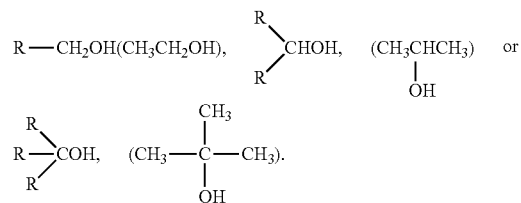

* * * * *